United States Patent [19]
Smith et al.

[11] Patent Number: 5,398,666
[45] Date of Patent: Mar. 21, 1995

[54] TURNTABLE CONVECTION HEATER

[75] Inventors: Donald P. Smith, Dallas; William W. Plumb, Longview; Jarald E. High, Grand Prairie, all of Tex.

[73] Assignee: Patentsmith II, Inc., Dallas, Tex.

[21] Appl. No.: 48,817

[22] Filed: Apr. 16, 1993

Related U.S. Application Data

[60] Division of Ser. No. 699,744, May 14, 1991, Pat. No. 5,205,274, which is a continuation-in-part of Ser. No. 411,400, Sep. 22, 1989.

[51] Int. Cl.6 .............................................. F24C 15/32
[52] U.S. Cl. ................................. 126/21 A; 126/21 R; 99/423; 432/142
[58] Field of Search .............. 126/21 A, 21 R, 273 R; 99/422, 427, 473, 477, 479, 339, 423, 331, 443; 432/142

[56] References Cited

U.S. PATENT DOCUMENTS

| | | | |
|---|---|---|---|
| 4,116,620 | 9/1978 | Stibbe | 432/59 |
| 4,492,839 | 1/1985 | Smith | 126/21 A X |
| 4,506,652 | 3/1985 | Baker et al. | 126/21 A |
| 4,753,215 | 6/1988 | Kaminski et al. | 126/21 A |
| 4,781,169 | 11/1988 | Henke et al. | 126/21 A |
| 4,924,763 | 5/1990 | Bingham | 99/339 |
| 5,131,841 | 7/1992 | Smith et al. | 126/21 A |
| 5,205,274 | 4/1993 | Smith et al. | 126/21 A |

*Primary Examiner*—Larry Jones
*Attorney, Agent, or Firm*—Crutsinger & Booth

[57] ABSTRACT

A method and apparatus for heating or cooling a product which includes a plurality of tapered ducts in a cabinet above and below a turntable to form streams which are directed toward the product. Spent air is drawn through intake openings in return ducts in the cabinet. Temperature controlled gas is delivered at an angle through an array of openings adjacent opposite edges of an opening through which a product is loaded on the turntable in a loading zone to cause most of the heated air to be drawn to return duct openings and to maintain internal pressure in the baking zone in the cabinet to prevent ingress and egress of air through the loading opening. Orifices are formed in a circular array of rings such that the sum of the areas of orifices in each ring spaced from the axis about which the turntable rotates is substantially equal.

2 Claims, 15 Drawing Sheets

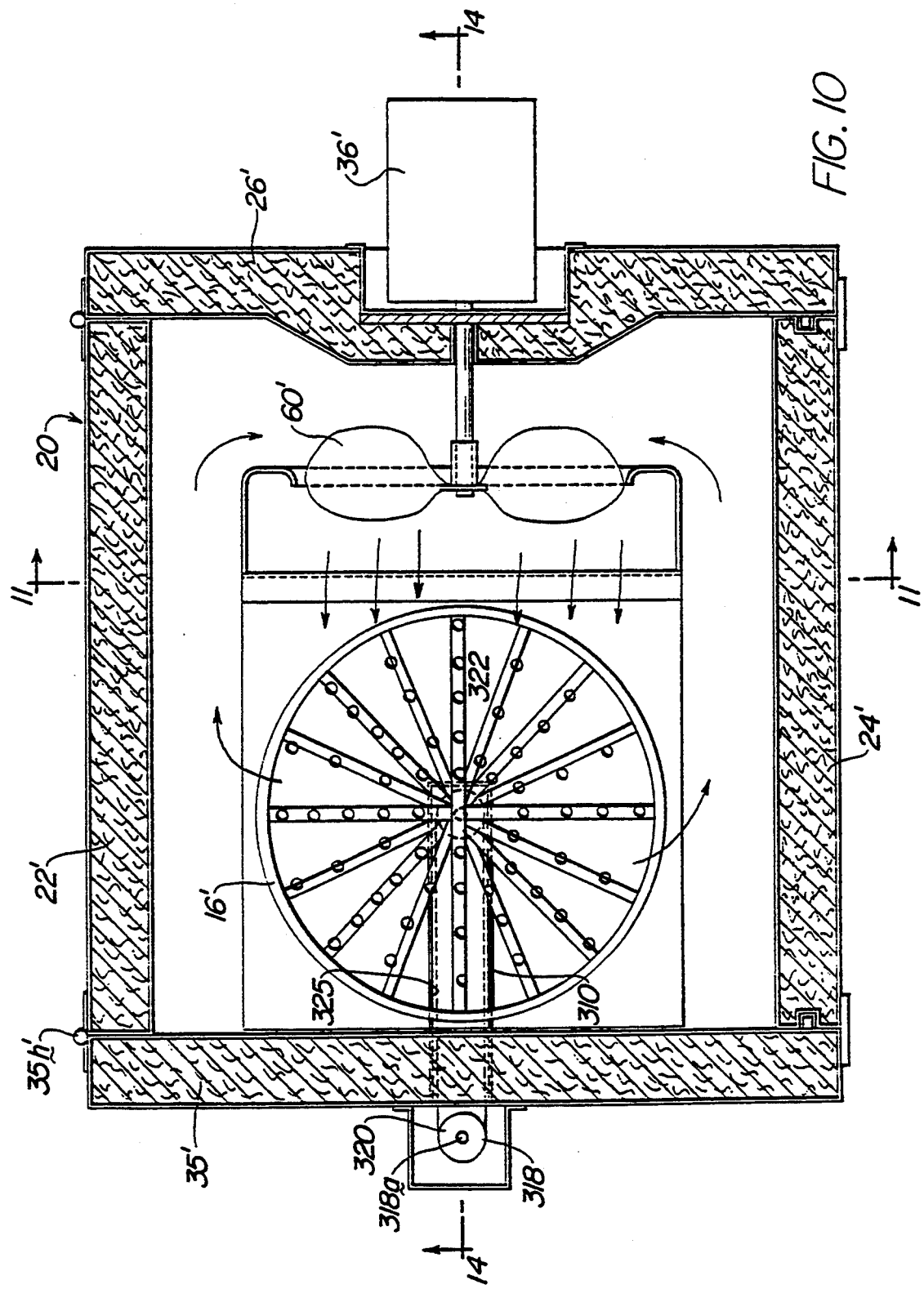

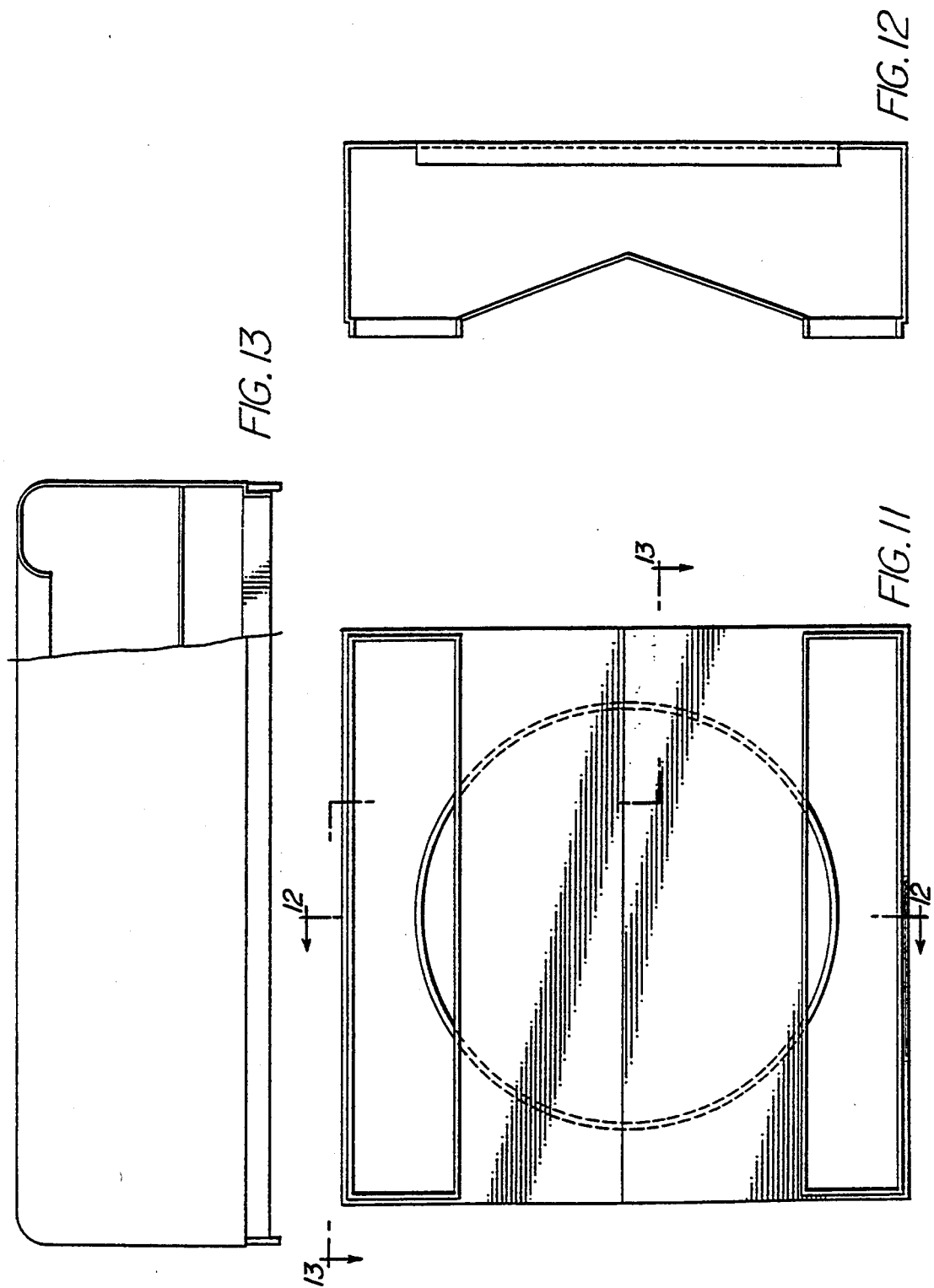

TURNTABLE CONVECTION HEATER

CROSS-REFERENCE TO RELATED APPLICATIONS

This is a division of application Ser. No. 07/699,744, filed May 14, 1991, now U.S. Pat. No. 5,205,274, which is a continuation in part of Ser. No. 07/411,400, filed Sep. 22, 1989.

TECHNICAL FIELD

The convection heat transfer apparatus disclosed herein incorporates improved air circulating apparatus adapted to form air streams which impinge a food product in discrete subareas of the surface as the product rotates on a turntable for heating or cooling.

BACKGROUND OF INVENTION

Cooking apparatus of the type disclosed in U.S. Pat. No. 3,884,213, entitled "Cooking Apparatus" which issued May 20, 1975 to Donald Paul Smith, directed jets of temperature controlled gaseous fluids to impinge against irregularly shaped food products to subject discrete areas on the surface of the food product to a very high heat transfer rate. The subareas subjected to the high heat transfer rate were moved over the surface of the product to obtain desired overall surface effects such as crisping, browning, searing or freezing. Impingement ovens made in accordance with the teachings of U.S. Pat. No. 3,884,213 are commercially available from Enersyst Development Center, Inc. of Dallas, Tex., under its registered trademark "JET SWEEP" and from its licensees, Lincoln Foodservice Products, Inc. of Fort Wayne, Ind., under its registered trademark "IMPINGER"; Middleby Marshall, Inc. of Morton Grove, Ill., under its registered trademark "PACE SETTER"; and Fujimak Corporation of Tokyo, Japan. "JET SWEEP", "IMPINGER" and "PACE SETTER" ovens have enjoyed extensive commercial success, particularly for cooking pizzas.

The heat transfer apparatus disclosed herein relates to improvements in devices of the type disclosed in U.S. Pat. No. 4,154,861, entitled "Heat Treatment of Food Products"; U.S. Pat. No. 4,338,911, entitled "Cooking Apparatus"; U.S. Pat. No. 4,377,109, entitled "Apparatus for Baking Food Products Such as Pizzas"; U.S. Pat. No. 4,479,776, entitled "Thermal Treatment of Food Products"; U.S. Pat. No. 4,492,839, entitled "Thermal Treatment Apparatus"; U.S. Pat. No. 4,523,391, entitled "High Efficiency Impingement Heating and Cooling Apparatus"; U.S. Pat. No. 4,679,542 entitled "Fan-Plenum Configuration"; U.S. Pat. No. 4,462,383, entitled "Impingement Food Preparation Apparatus"; U.S. Pat. No. 4,474,498, entitled "Multiple-Pass Impingement Heating and Cooling Device"; and U.S. Pat. No. 4,757,800 entitled "Air Flow System for A Low Profile Impingement Oven."

These patents disclose improvements in cooking apparatus of the type disclosed in U.S. Pat. No. 3,884,213 and generally relate to a variety of structures for improving air flow to and from irregular-shaped food products for increasing cooking efficiency.

U.S. Pat. No. 3,884,213 disclosed a cooking apparatus in which a pizza or other food product was supported on a carriage. The carriage reciprocated between upper and lower jet plates which formed and projected spaced jets of heated air toward upper and lower surfaces of the food product. Passages in the jet plate were spaced such that spent air from the jets, after impinged against upper and lower surfaces of the food product, was drawn between the spaced air jets enroute to an intake opening to an impeller which circulated the air. A second embodiment disclosed in Smith U.S. Pat. No. 3,884,213 incorporated a stationary food support in which the jet plate was moved for causing the point at which the air jets impinged on the food product to move relative to the food product.

In microwave ovens, food products have been supported on turntables rotating between upper and lower jet plates of the type disclosed in Smith U.S. Pat. No. 3,884,213. The ovens were similar to that disclosed in Smith U.S. Pat. No. 3,884,213 except that the food product was supported on a rotating turntable.

Bingham U.S. Pat. No. 4,924,763, issued May 15, 1990, entitled "Compact Pizza Oven", is assigned to Pizza Hut of Wichita, Kans., and discloses an oven in which a turntable supports a pizza rotated about its center while heated air is delivered through top and bottom slots toward upper and lower surfaces of the pizza as the turntable rotates. The slots are disclosed as having midpoints above and below the center of the turntable and a length substantially equal to the diameter of the turntable. An oven door is hinged on one vertical side of the oven and the turntable, which is connected to the door. The turntable is driven by a motor located on the door and is brought out of a baking chamber when the door is swung open.

Pizza Hut U.S. Pat. No. 4,924,763 summarizes the history of pizza ovens which has evolved from the use of deck ovens requiring a bake time between 15 and 25 minutes per pizza to modern impingement ovens of the type disclosed in U.S. Pat. No. 4,679,542 issued to Don Paul Smith having a typical bake time in a range of 5 to 9 minutes.

SUMMARY OF INVENTION

The apparatus for heat treatment of food products disclosed herein includes a rotating turntable for supporting moist irregularly shaped food products, in combination with improved apparatus for forming spaced air streams and directing the spaced air streams toward the surface of the food products. As the turntable rotates, the air streams impinge against discrete areas on the surface of the food product.

The apparatus for forming spaced air streams includes a plate having air dispensing passages formed therein, the passages being arranged in an array to form concentric rings of progressively increasing diameter and area, each of the concentric rings containing a different number of passages from the number of passages in each adjacent ring.

Air dispensing passages in the concentric rings are irregularly spaced to form a plurality of generally radially extending return paths such that high velocity streams of air are allowed to impinge against the surface of the food product without significant interference from spent air which has already impinged against the surface of the product.

In the disclosed embodiment, air streams are formed and directed to impinge against upper and lower surfaces of the product from jet forming apparatus above and below the turntable. Air passages in the lower jet forming apparatus are arranged in a substantially circular pattern while the jet forming apparatus above the turntable are arranged in a substantially semi-circular pattern.

The heating device disclosed herein comprises a baking chamber in which a food product is supported on a rotating circular turntable as air streams are directed through orifices above and below the turntable toward upper and lower surfaces of the food product. The orifices, through which air is directed to form streams which impinge upon surfaces of the food product before the streams diffuse, are formed to provide substantially uniform heating of upper and lower surfaces of the food product from the center of the turntable to near the perimeter of the circle. However, it should be appreciated that the balance of heating between upper and lower surfaces may be adjusted to suit the particular product being baked. For example, more heat may be delivered to the bottom of a pizza in a pan than to a pizza on an open mesh screen. The dimensions of the orifices are optimized to project an air stream a substantial distance from the surface of the plate in which the orifices are formed for achieving heat transfer to or from products of varying heights. The number and pattern of orifices, if formed in concentric circles, provide equivalent heat transfer over the entire surface of the food product.

Orifices in each concentric ring are formed in an array such that the number of streams of temperature controlled gas in each of a plurality of rings spaced radially from the center of the turntable toward the perimeter are arranged to provide averaged uniform heating over the surface of the product.

Particulate products, such as sliced vegetables or meat, but not necessarily foods, are preferably placed in a removable container on the turntable and then rotated under or between air streams which repetitively impinge on the surface of the products.

Further, an array of inclined air streams impinge against splash surfaces in the vicinity of the center of the turntable to form a baking zone on one side of an array of inclined streams and a loading or tempering zone on the other side of the array of inclined streams. Air, drawn toward and entrained by streams of the inclined array, is deflected away from the baking zone when the air stream divides as it splashes, while heated air circulating in the oven is deflected toward the baking zone in the oven.

In some embodiments, first and second arrays of air streams are advantageous. The first array of streams is angled or inclined relative to streams of the second array and the streams of the second array define a cooking area with maximum heating efficiency.

Improved air flow into dispensing ducts and improved uniformity of baking is provided by a grid with multiple linear passages in the dispensing duct to form air streams which move longitudinally into the interior of the duct. A vane in the duct may be used to direct a portion of the streams of longitudinally moving air toward selected areas of the duct for balancing and substantially equalizing air flow from different areas of the dispensing duct. As air leaves the blower and turns into the dispensing ducts the rapidly moving air concentrates toward the outside of the turning radius leaving a low pressure area inside the turning radius. This low pressure area causes extreme turbulence wasting air velocity and also causes the air to apply reduced pressure to the duct openings near the inlet to the duct. The reduced pressure in these openings causes less heat transfer and uneven baking across the conveyor. A multiple opening directing means with linear passages eliminates most of the turbulence in the low pressure area and reduces the starving of the openings nearest the inlet of the duct, thus providing improved uniformity of baking.

DESCRIPTION OF DRAWINGS

Drawings of three embodiments of the conveyorized oven are annexed hereto so that the invention may be better and more fully understood, in which:

FIG. 10 is a cross-sectional view taken along line 10—10 of FIG. 9;

FIG. 11 is a cross-sectional view taken along line 11—11 of FIG. 10;

FIG. 12 is a cross-sectional view taken along line 12—12 of FIG. 11;

FIG. 13 is a partially sectionalized view taken substantially along line 13—13 of FIG. 12;

Numeral references are employed to designate like parts throughout the various figures of the drawings.

DESCRIPTION OF PREFERRED EMBODIMENTS

Figure 1:
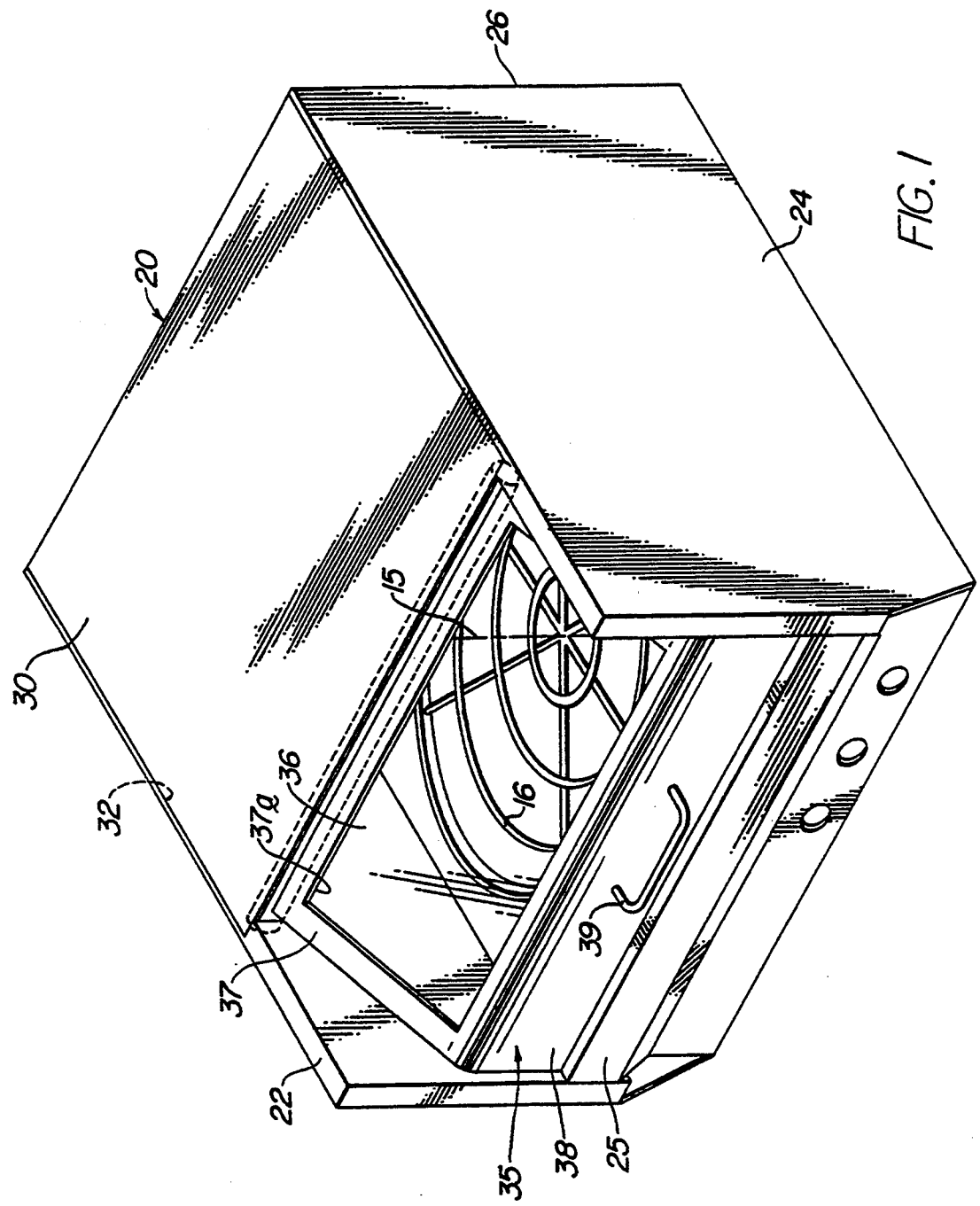
FIG. 1 is a perspective view of a first embodiment of the turntable convection heater having a central air return and a closure forming a hood.

Three embodiments of the heat transfer device are disclosed. In the first embodiment, illustrated in FIGS. 1–8 of the drawing, spent air returns to a central return duct. In second and third embodiments, illustrated in FIGS. 9–18 and FIG. 19, respectively, spent air returns along sides of the baking zone.

Referring to FIG. 1 of the drawing, the numeral 20 generally designates a cabinet having spaced side walls 22 and 24, a front wall 25, back wall 26, bottom wall 28 and top wall 30. Front wall 25 is shorter than side walls 22 and 24 to provide an entrance opening 33 into the interior of the cabinet 20.

Figure 2:
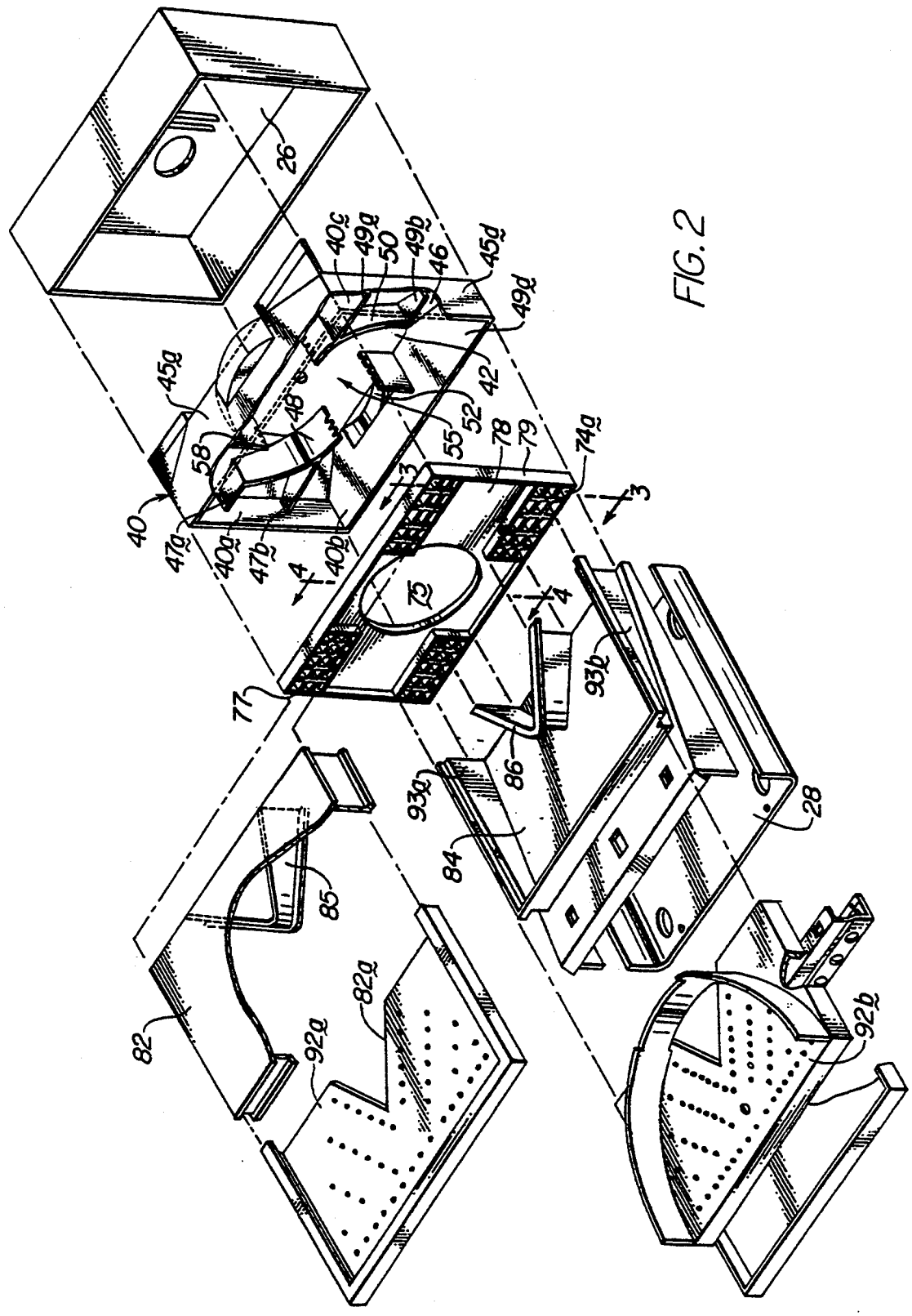
FIG. 2 is an exploded perspective view thereof.
Figure 3:
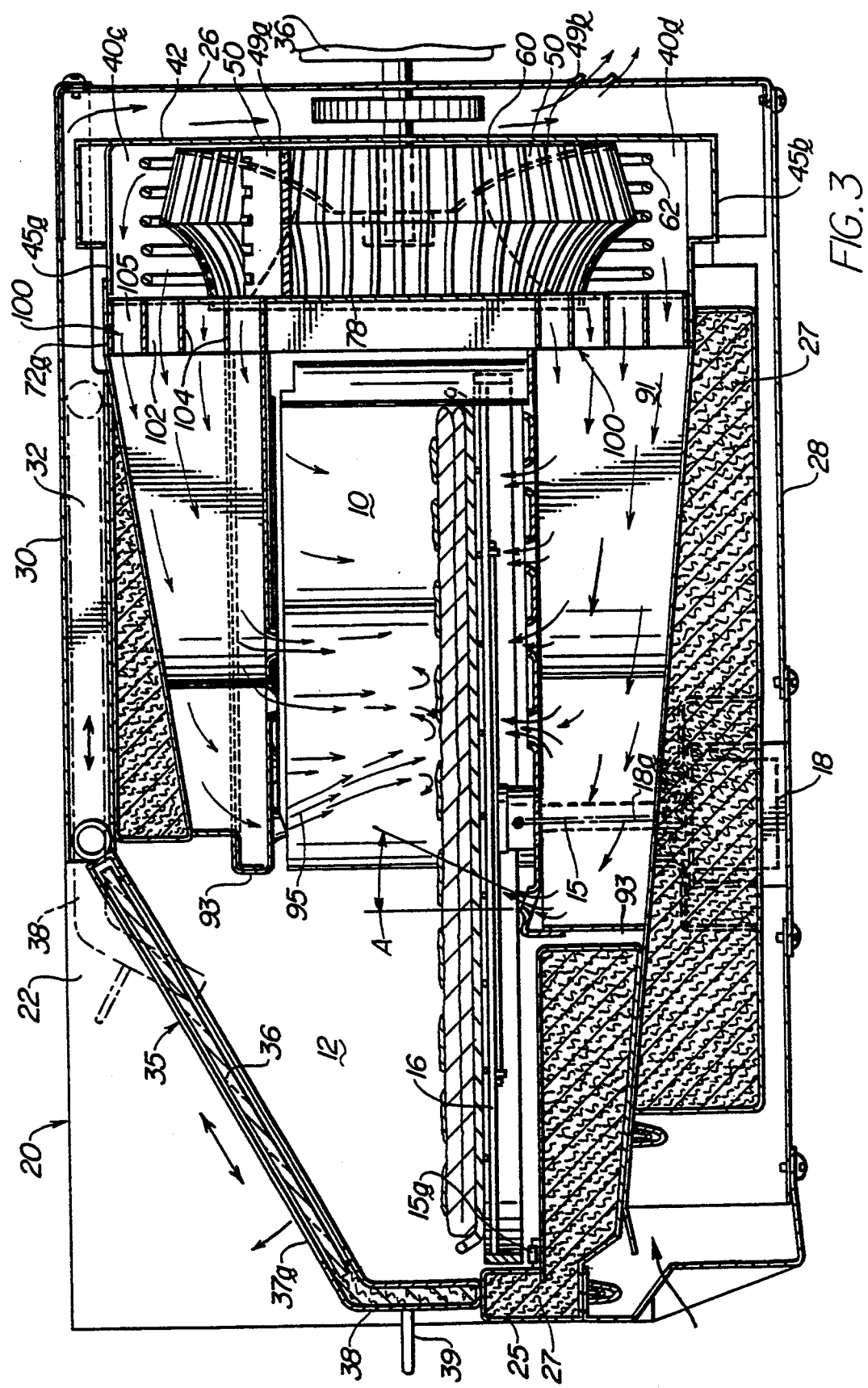
FIG. 3 is a cross sectional view taken substantially along line 3—3 of FIG. 2, illustrating air dispensing ducts.

As best illustrated in FIGS. 1 and 3 of the drawing, tracks 32 extend along upper portions of side walls 22 and 24 adjacent top 30 and a door 35 having glide rollers 35r secured adjacent opposite sides thereof is adapted to be rotated through an angle of about 45° from the position illustrated in FIG. 2 of the drawing such that glass 36 closing a central opening in door 35 is in a substantially horizontal position. Door 35 may be then be pushed into track 32 until panel 38 is positioned adjacent the entrance opening into track 32 in top wall 30. A handle 39 is secured to front panel 38 of door 35 to facilitate moving the door between the closed position illustrated in FIGS. 1 and 2 of the drawing and an open position wherein a substantial portion of door 35 is concealed in top 30 of cabinet 20.

It should be appreciated that door 35 having a front panel 38 inclined relative to the central portion 37 of the door having an opening 37a closed by glass 36 forms a hood when raised to the elevated position shown in dot-dash outline in FIG. 3.

A turntable 16 driven by a motor 18 rotates about a substantially vertical axis 15. Turntable 16 to support the food product P preferably comprises a circular continuous loop wire mesh disc rotatably supported by rollers 15a.

Suitable means for driving the turntable 16 comprises a variable speed electric motor 18 having a drive shaft 18a which is drivingly connected to a driven hub 16a at the center of turntable 16. Suitable speed control means such as a rheostat (not shown) is provided for controlling the speed of drive motor 18.

Figure 4:
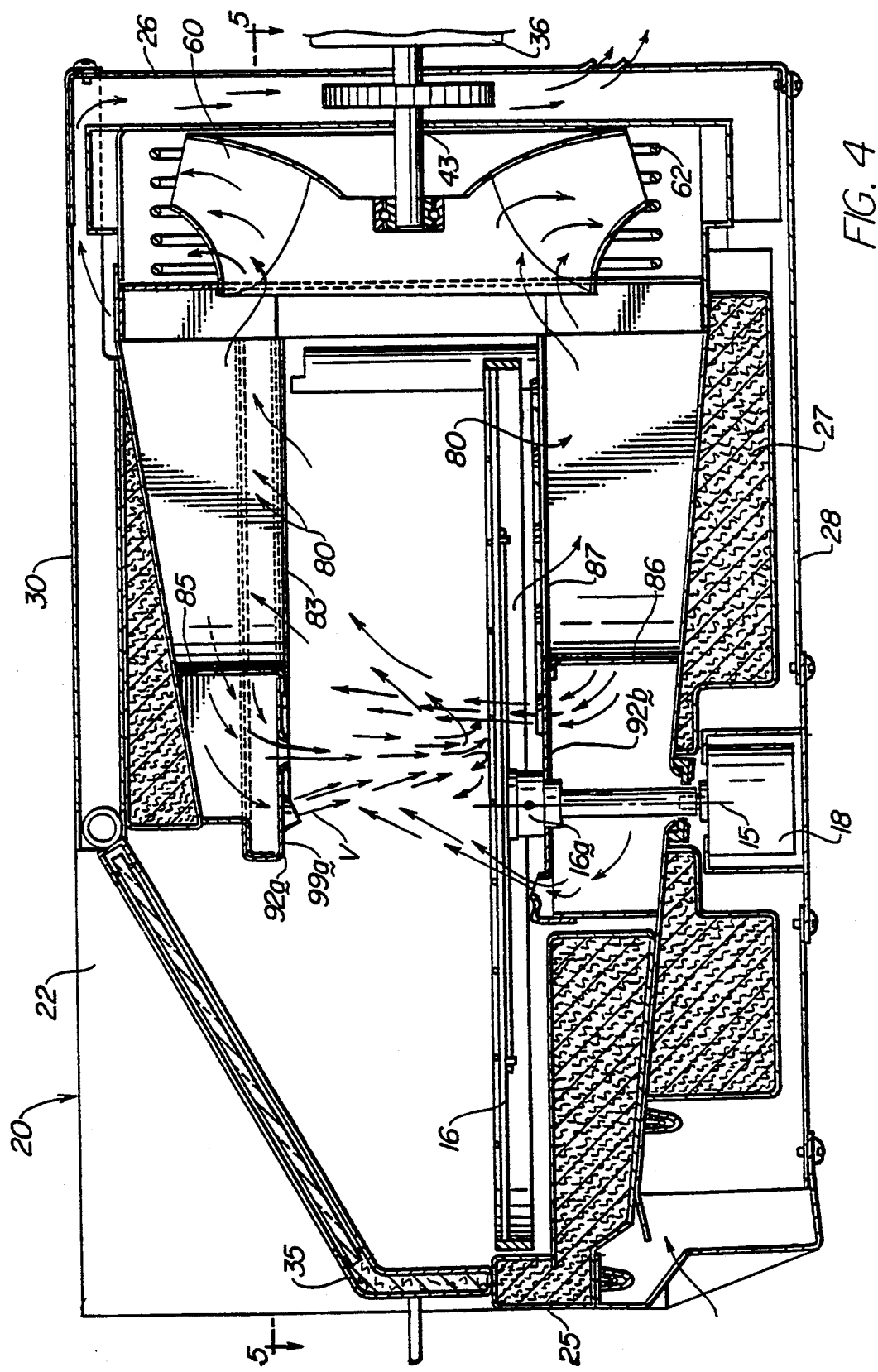
FIG. 4 is a cross sectional view taken substantially along line 4—4 of FIG. 3, illustrating air return ducts.

In the embodiment of the invention illustrated in FIGS. 1–8 of the drawing, an impeller 60 draws air through a central return opening 80, as illustrated in FIG. 4 of the drawing, and delivers air radially through upper air dispensing ducts 90a and lower air dispensing ducts 90b, as illustrated in FIG. 3 of the drawing.

As best illustrated in FIGS. 1 and 3 of the drawing, front wall 25, top wall 30 and bottom wall 28 are formed by outer pieces of sheet metal forming a cavity containing insulation 27 to prevent thermal conduction through walls of the oven.

A partition wall 40 extends between side walls 22 and 24 and is mounted adjacent rear wall 26 to form a plurality of plenums 40a, 40b, 40c, and 40d in cabinet 20, as illustrated in FIG. 2.

Referring to FIGS. 2 and 4 of the drawing, partition wall 40 includes a generally flat central portion 42 having a central opening 43 through which a shaft for a fan motor 36 extends. Inclined walls 44 and 46 are secured adjacent opposite edges of the central portion 42 of partition wall 40. A flange 45 comprising an upper leg 45a, a lower leg 45b and spaced vertically extending legs 45c and 45d, extends about the periphery of partition wall 40. Baffles 47a and 47b support a vane 48 which extends around a portion of the periphery of a blower 60 as will hereinafter be more fully explained. Baffles 49a and 49b support a vane 50. A lower vane 52 has one end welded or otherwise secured to leg 45b of flange 45 and has another end supported by baffle 54 welded or otherwise secured to leg 45b of flange 45. A vane 56 has one end welded or otherwise secured to leg 45a of flange 45 and has another end supported by a baffle 58 secured to flange 45a.

A heating element 62 in the form of an electrically energized coil is supported in notches formed in vanes 48 and 50 and baffles 54 and 58, as illustrated in FIG. 2. The temperature may be adjusted by a thermostat 21a (not shown) mounted on the front wall of the cabinet which is controlled by the temperature sensors located in plenum 40d.

As will be hereinafter more fully explained, the baffles and vanes on partition wall 40, in the illustrated embodiment, form a blower housing 55 having four separate plenums 40a, 40b, 40c and 40d spaced around its periphery through which air is dispensed by a fan 60 into air dispensing ducts 90.

Plenum outlet openings are formed by an x-shaped plenum wall member 70 having generally vertically extending legs 72 and 74, as illustrated in FIG. 2, and transversely extending legs 76 and 78 which extend outwardly from a central opening 75. Leg 76 has a projection 77 extending outwardly from the end thereof which extends between baffles 47a and 47b on partition wall 40 while leg 78 has a protection 79 which extends between baffles 49a and 49b on partition 40. Legs 72 and 74 have projections 72a and 74a which are positionable adjacent baffles 54 and 56 for securing plenum wall member 70 to flange 45 which extends about the periphery of partition wall 40.

As will be hereinafter more fully explained, hollow flanges 76a, 76b, 78a and 78b are formed on legs 76 and 78 and form entrance openings from plenums 40a, 40b, 40c and 40d into an upper air dispensing duct 90a and a lower air dispensing duct 90b.

Air drawn by fan impeller 60 from the upper and lower return ducts through openings 75 and 75a is projected from blower housing 55 generally radially into corners of plenums 40a, 40b, 40c and 40d. The air flowing into each plenum is turned by inclined walls 44 and 46 toward the passages 40a', 40b', 40c', and 40d bounded by flanges 78a, 78b, 76b and 76a into upper dispensing duct 90a and lower dispensing duct 90b. Thus, the direction of flow of air from fan 60 is turned 90 degrees from a plane parallel to back wall 26 into ducts 90a and 90b extending transversely above and below turntable 16. As will be hereinafter more fully explained, a grid 100 of elongated passages 105 is employed to balance air flow into ducts 90a and 90b to attain uniform air flow through openings 94, 96 and 97 across turntable 16 into the cooking compartment.

In a preferred embodiment air streams are advantageously concentrated in less than full circles for easy access to the turntable or for clearance to apply radiant heating. If air streams are applied for only part of each rotation of the turntable, the repetition of exposure to the streams formed by the jets must be sufficient so that equivalent effects are obtained by fewer air streams applied to small center areas near axis 15 and for multiple streams applied to a much larger outer circular area. The importance of this on foods, such as a circular pie with top crust, is shown by the effect at too slow rotation where the pie crust would spend so much time directly under the one orifice 94a near the center stream or the two orifices 94b in the second ring. The center of the disk shaped crust would be dried during the first pass and then burned or overbaked during the second pass while the crust in concentric rings 94g and 94h of areas nearer the perimeter would receive many short time exposures and the heat would be conducted from the crust to the interior of the pie. The exposure of the crust to each stream formed by orifices 94h is so short that localized overheating is eliminated. Orifice configuration and turntable rotating are preferably correlated such that the product is exposed to multiple passes of each air stream. For example, to assure uniform baking, the turntable may rotate a point on the surface of the product past each orifice in a ring of orifices five times.

As illustrated in FIG. 3, the air stream 95 formed by an array 98 of openings aligned substantially diagonally across plate 92 is tilted at an angle "A" relative to a vertical plane to divert entrained outside air toward the loading zone 12 outside of the baking zone 10 in the cabinet 20 and to direct heated air to the inside of the baking zone 10 in the cabinet when door 35 is open.

It should be apparent that stream 95 is composed of air from two sources. Temperature controlled air is projected from ducts 90a and 90b to form air streams 95. Since the static pressure of the air stream is less than that of ambient air, a thin boundary layer of ambient air is entrained and travels with jet 95.

If a product P is not on turntable 16 adjacent air streams 95, the streams will be projected through wire mesh turntable 16 and impinge upon splash surfaces 99a and 99b on the opposing air dispensing duct 90a or 90b, in the configuration of the apparatus illustrated in FIG. 4 of the drawing. As the product P is carried by turntable 16 between air streams 95, the surface of product P is engaged by the inclined air streams 95 causing the boundary layer of ambient air to be recirculated forming a vortex in the area immediately adjacent entrance opening 33, the recirculating vortex V of ambient air tends to reduce heat loss through opening 33. Referring to FIG. 4 of the drawing, the numeral 80 generally designates upper and lower air return passages formed by generally V-shaped shroud members 85 and 86 are secured to cowling members 82 and 84 and are received in complimentary shaped passages 82a and 82b formed in upper jet plate 92a and lower jet plate 92b.

Figure 6:
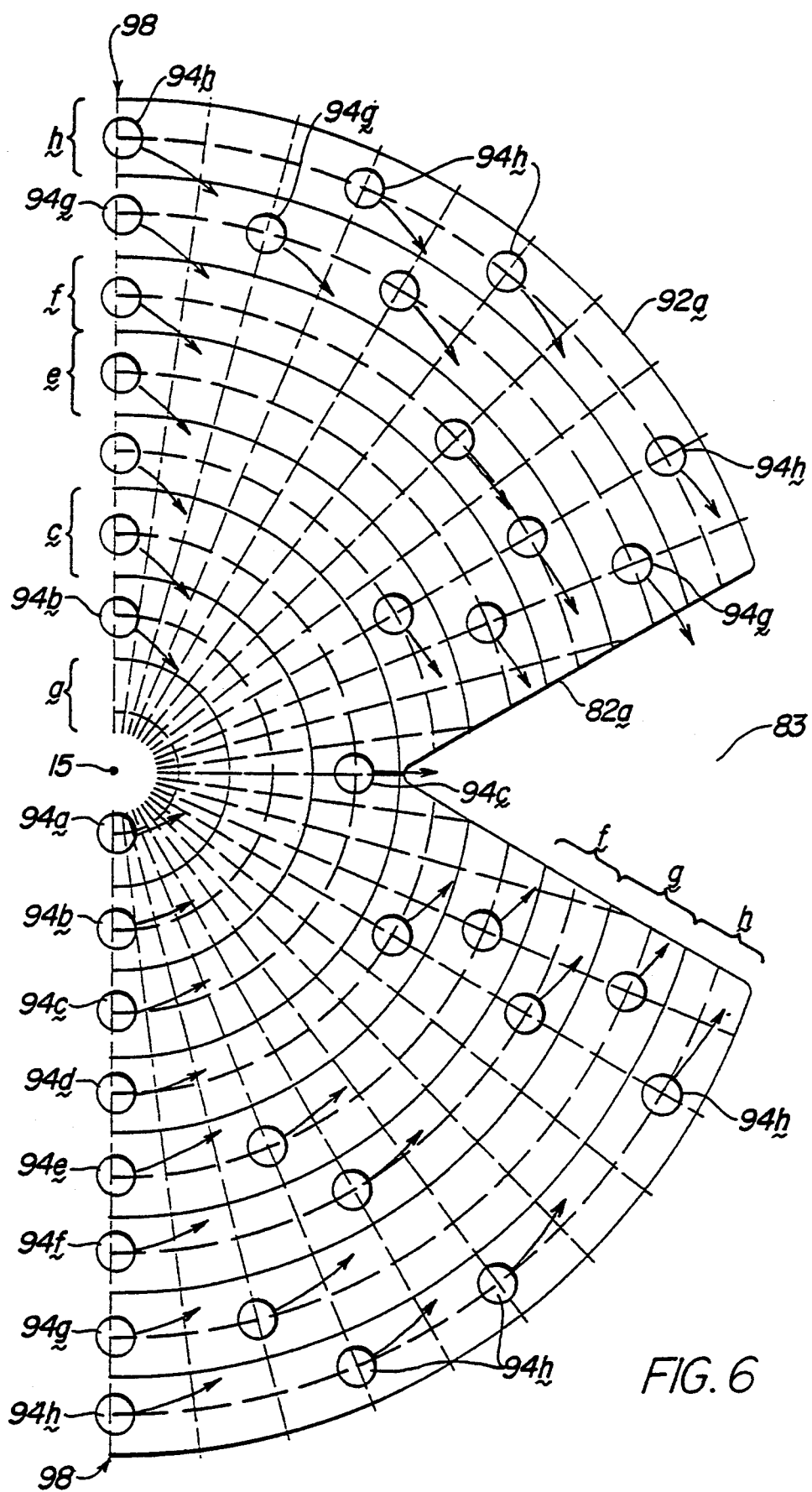
FIG. 6 is an enlarged elevational view illustrating the array of orifices formed in the jet plate illustrated in the embodiment of FIG. 2.

In the embodiment of the invention diagrammatically illustrated in FIG. 6 of the drawing, upper jet plate 92a has a V-shaped notch 82a formed therein through which air returns to the intake of fan 60. A plurality of apertures are formed in jet plate 92 and are generally arranged in a semi-circular pattern. The innermost ring of passages is formed by an orifice 94a spaced from the vertical axis 15 about which the turntable 16 rotates. A second ring of passages is formed by two orifices 94b.

Orifices 94 in each semi-circular ring or band of orifices are labeled with a subscript, orifice 94a lying in the innermost ring nearest axis 15 and orifice 94h lying in the outermost ring most distant from axis 15. The term "ring" as used herein means a curved band lying between the peripheries of two concentric circles.

It should be appreciated that the innermost ring "a" contains one orifice 94a while the eighth ring "h" of orifices contains eight orifices 94h. The orifices 94 are circumferentially spaced in each ring "a"-"h".

Air return openings 82a, 83 and 87 are formed to balance the flow of spent air across the width of turntable 16 between edges 15f and 15r to balance air pressure in cabinet 20 across the width of entrance opening 33.

Referring to FIGS. 3 and 4 of the drawing, air dispensing ducts 90a and 90b comprise hollow tapered fingers of the general type disclosed in U.S. Pat. No. 4,338,911, the disclosure of which is incorporated herein by reference in its entirety for all purposes, having a perforated surface 92 in which stream forming openings are formed.

As best illustrated in FIGS. 3 and 6 of the drawing, upper dispensing duct 90a and lower dispensing ducts 90b are spaced above and below turntable 16 and are arranged to direct streams of heated air toward the surface of the product P on the turntable 16, as will be hereinafter more fully explained.

Ducts 90a and 90b preferably comprise channel-shaped body members having a web extending between spaced flanges 93a and 93b which function as sidewalls of each duct.

As illustrated in FIG. 3, the cross-sectional area of each duct 90 is greater adjacent its inner end 91 which communicates with the respective plenums 40a, 40b, 40c, and 40d and decreases along the length of the duct toward the outer end 93. The decreasing cross-sectional area allows for even pressure distribution of the heated air along the length of the cavity though each duct 90. It should be apparent that the major dimension of each duct 90a and 90b is the length thereof which is the distance between ends 91 and 93 of each duct.

Plates having a perforated surface 92a, 92b are secured across the open side of ducts 90a and 90b. A plurality of rows of perforations are formed in plate surface 92 and are arranged in the pattern as illustrated in FIG. 6.

As will be hereinafter more fully explained, each air duct 90 has a splash surface 99a or 99b formed thereon against which streams 95 of heated gas of the second array formed by passages 98a or 98b impinge for separating heated air flowing through the duct from outside air which may be drawn into the air stream 95.

Figure 9:
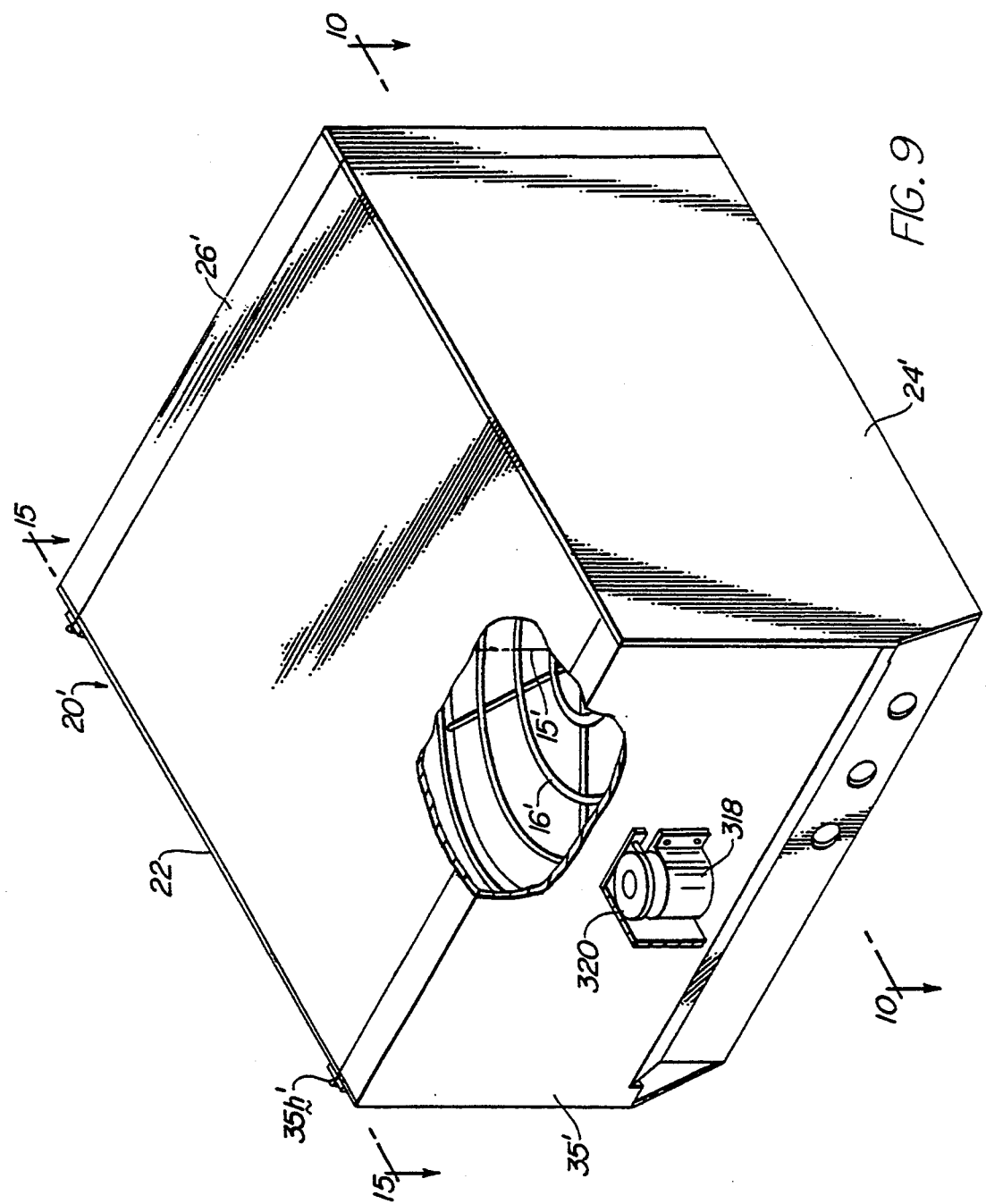
FIG. 9 is a perspective view of a second embodiment of the turntable convection heater in which air returns along sides of the baking area and the turntable is mounted to move out of the oven when the door is opened.
Figure 14:
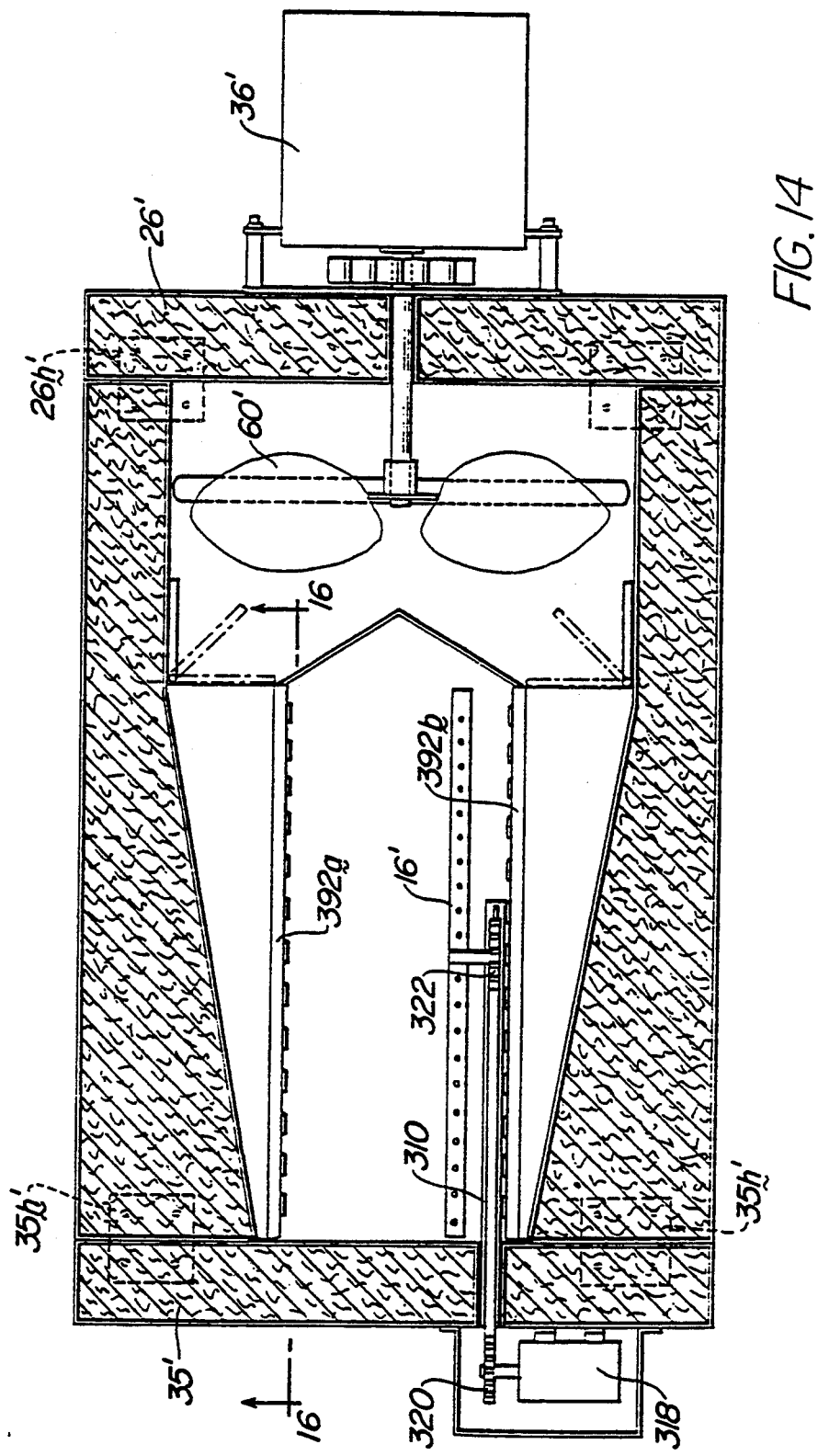
FIG. 14 is a cross-sectional view taken substantially along line 14—14 of FIG. 10.

As best illustrated in FIGS. 3 and 9 of the drawing, transversely extending inner-connected vertical partitions 102 and horizontal partitions 104 form a grid 100 of elongated passages 105, which project distinct generally parallel air streams, as indicated by arrows, which flow longitudinally into the interior of each air dispensing duct 90a and 90b.

It is important to note that although baffles and vanes have been employed heretofore, for example as disclosed in U.S. Pat. No. 4,757,800 in an effort to eliminate "cork-screw" effect of air delivered by axial fans, passages through the baffles have been relatively short compared to spacing between the baffles. Consequently, distinct parallel air streams were not formed as the air was moved through the passages between baffles. It is important that the length of each passage 105 be at least as long as the spacing between parallel surfaces of adjacent members 102 and adjacent members 104 to form streams which tend to flow substantially linearly into each duct 90a and 90b.

Each air dispensing duct 90, having a perforated surface 92, adapted to form and deliver a plurality of streams of air, is supported adjacent a first edge of the baking zone 10 such that air streams 95 formed by the row 98 of orifices are projected across the opening into the baking zone 10. Each stream 95 is inclined toward the interior of the chamber at an angle indicated by "A" in FIG. 3 in a range of 3° to 30° relative to the vertical plane to form a stream of air across the opening. The air stream is inclined toward the interior of the oven so that most of the hot air returns to the interior of the oven and the entrained ambient air which has become part of the air stream is defected toward the loading zone 12 in the oven.

Perforated surface 92 has a first array of openings in rings a-h having a primary function of transferring heat to the product P and a second array of openings in a row 98 configured to recirculate ambient outside air adjacent openings between loading zone 12 and baking zone 10. Openings 94 and 98 of each array preferably comprising circular apertures, centers of said apertures being spaced apart a distance not exceeding about four times the diameter of the apertures.

Air directing grid 100 in the air dispensing duct is adapted to form a plurality of generally parallel horizontally directed air streams in each air dispensing duct 90a and 90b as a volume of air is delivered through passages 105. Each of the passages 105 preferably has a length which is equal to or greater than the maximum dimension of any cross sectional area of the passage 105 and preferably at least two times the maximum width or height of the cross-section of the passage 105.

Air return ducts 80a and 80b formed by air scoop 80, adjacent air dispensing ducts 90, have inlet openings 83 and 87 positioned intermediate opposite ends of air dispensing ducts 90 for returning air flowing through the perforated surface 92 of each duct. The return ducts preferably have generally V-shaped entrance openings 83 and 87, said entrance openings lying in a plane generally parallel to the plane of the turntable 16. Blower 60, between the air return ducts 80a and 80b and the air dispensing ducts 90a and 90b, is adapted to draw air from a central portion of the chamber through the V-shaped openings 83 and 87 and to deliver air into the dispensing ducts 90a and 90b through plenums 40a, 40b, 40c and 40d. Heater element 62 is in heat exchange relation with air circulated by blower 60.

It should be appreciated that an improved method of controlling heat transfer to a surface of a food product P is performed by the apparatus hereinbefore described, for heating or cooling. The method is particularly effective for toasting and warming partially prepared food products as well as cooking or freezing.

A first array of a plurality of streams of high velocity gas is directed toward the surface of the product such that the streams of the first array of high velocity gas impinge against discrete areas on the surface of the product to wipe away a boundary layer of air and moisture from the discrete areas against which the streams of the first array impinge. The product P is moved by turntable 16 relative to the streams of the first array such that heat is transferred, at areas upon which the streams of the first array impinge. A second array of streams of high velocity heated gas are directed at an angle "A" in a range of 3° to 30° relative to the generally vertical streams in the first array to prevent movement of spent air from the first array of streams from a confined area in the compartment.

The fact that spent gas from streams of the first array is contained in the confined area by streams of the second array and travels between streams of the first array prevents diffusion of gas in streams of the first array prior to impingement against the surface of the product. This is an important feature of the improved method.

Figure 7:
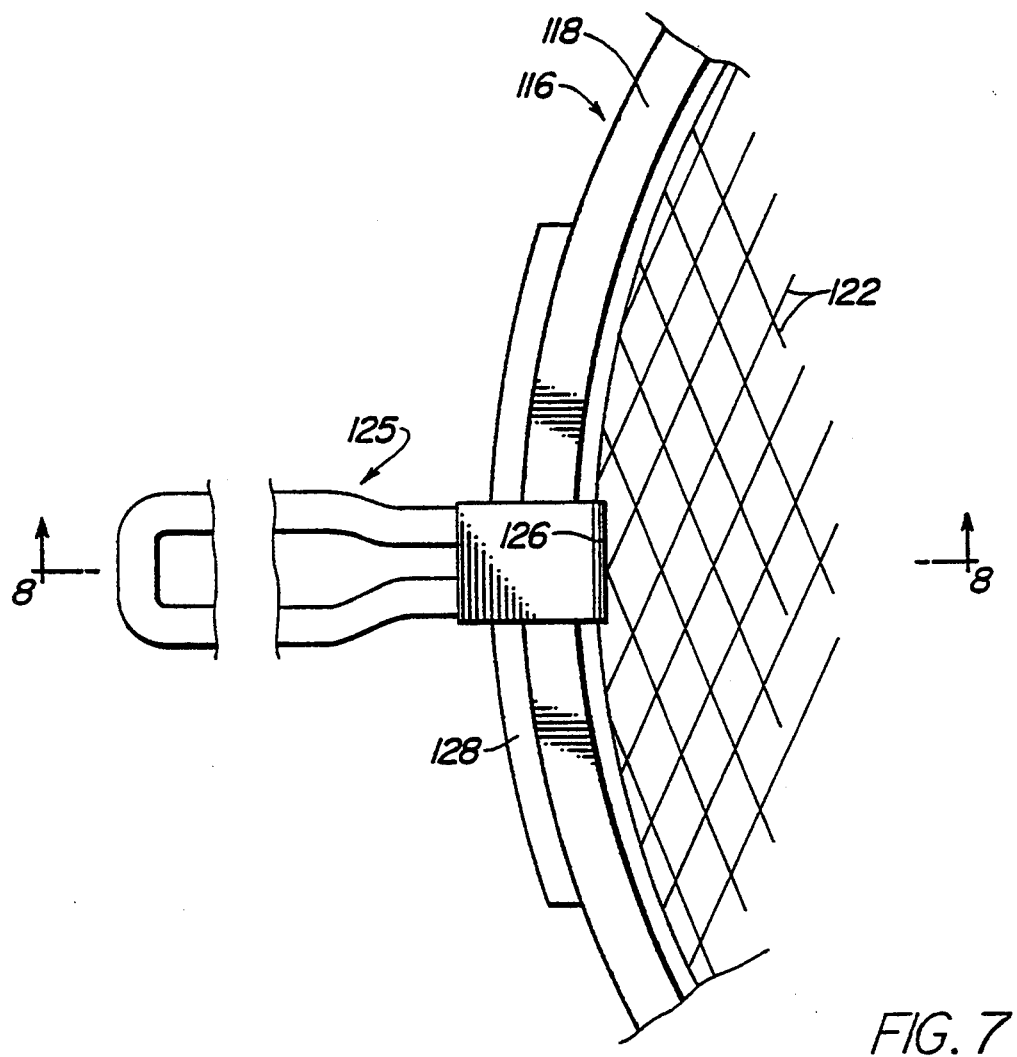
FIG. 7 is a fragmentary top plan view of a basket for supporting a product on the turntable.
Figure 8:
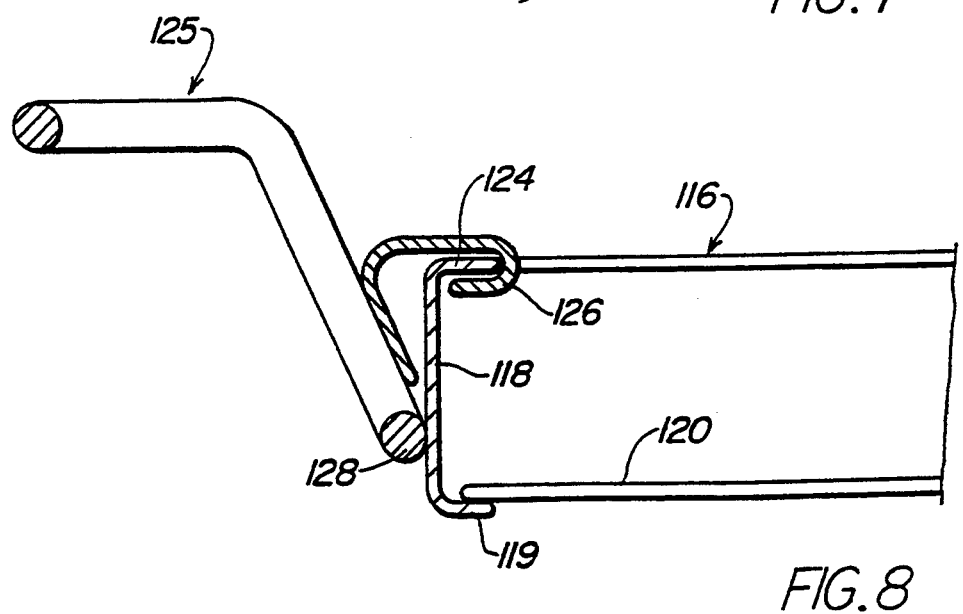
FIG. 8 is a cross-sectional view taken along line 8—8 of FIG. 7.

A basket generally designated by the numeral 116 is illustrated in FIGS. 7 and 8 of the drawing. Basket 116 is particularly adapted to be supported on turntable 16 for supporting a bed of material such as sliced potatoes or other vegetable, fruit or meat product.

Basket 116 is formed by a circular side wall 118 having an inturned lower ledge 119 for supporting a circular wire rack 120 formed by intersecting strands 122 of wire.

A removable handle 125 engages an inwardly extending upper rim 124. Handle 125 preferably has a hook portion 126 which partially encircles inwardly extending upper rim 124 and has a ledge 128 engagable with side wall 118 of basket 116.

It should be readily apparent that basket 116 can be moved for loading and unloading using handle 125. After basket 116 has been positioned on turntable 16, handle 125 can be removed so that it does not interfere with rotation of turntable 16 and basket 116.

Particulate products, such as sliced vegetables, meat, grain or cereal products, but not necessarily foods, are preferably placed in a removable container, such as basket 116, on the turntable 16 and then rotated under or between air streams which repetitively impinge on the surface of the products.

In a container 116 on a turntable 16 with an open mesh, perforated, expanded metal or foraminous bottom rotating between both upper and lower air streams, the air streams are advantageously placed in non-opposing positions so that the air from the streams penetrates the pile of products.

Another variation is use of a discontinuous surface such as screen mesh, perforated metal, or expanded metal for the turntable and application of air streams to the bottom of the agglomerate of products so that the air from the streams blows through a pile of products placed on the turntable. The air streams actually stir the product as it passes over the lower streams. A foraminous cover (not shown) on the container may be applied to contain the stirring product.

The baking device offers significant advantages over ovens heretofore devised. Air circulating at a temperature of approximately 420° F. with an air velocity of, for example, 2,000 feet per minute is capable of cooking refrigerated canned biscuits in a baking time of two minutes in the oven hereinbefore described with microwave.

Without microwave, the same refrigerated canned biscuits were cooked in a baking time of four minutes delivering heated air through the orifices at a temperature of 350° F. and at a velocity of 2700 feet per minute.

The typical baking time for refrigerated canned biscuits in a conveyorized tunnel oven is about six minutes employing air streams of a temperature of 360° F. at a velocity of 1600 feet per second. Typical natural convection or electric ovens used at home require a baking time of ten to thirteen minutes at a temperature of 400° F. and an air velocity in a range between zero and five feet per minute.

For cooking raw, thin crust pizza with moderate topping in an aluminum pan, a deck oven generally required a baking time of fourteen minutes at 500° F. The conveyorized jet impingement tunnel oven reduced the baking time to about six minutes using impinging air streams of 475° F. air at a velocity of 1600 feet per minute. The baking time for the pizza cooked in the oven hereinbefore described was four minutes employing impinging air streams of 425° F. air at a velocity of 2700 feet per minute.

The arrangement of the array of orifices forming the air streams in the oven, hereinbefore described and illustrated in FIG. 6 of the drawing, minimizes the distance spent air must travel from the point at which it impinges against the surface of the product enroute to the air return opening 83.

Figure 5:
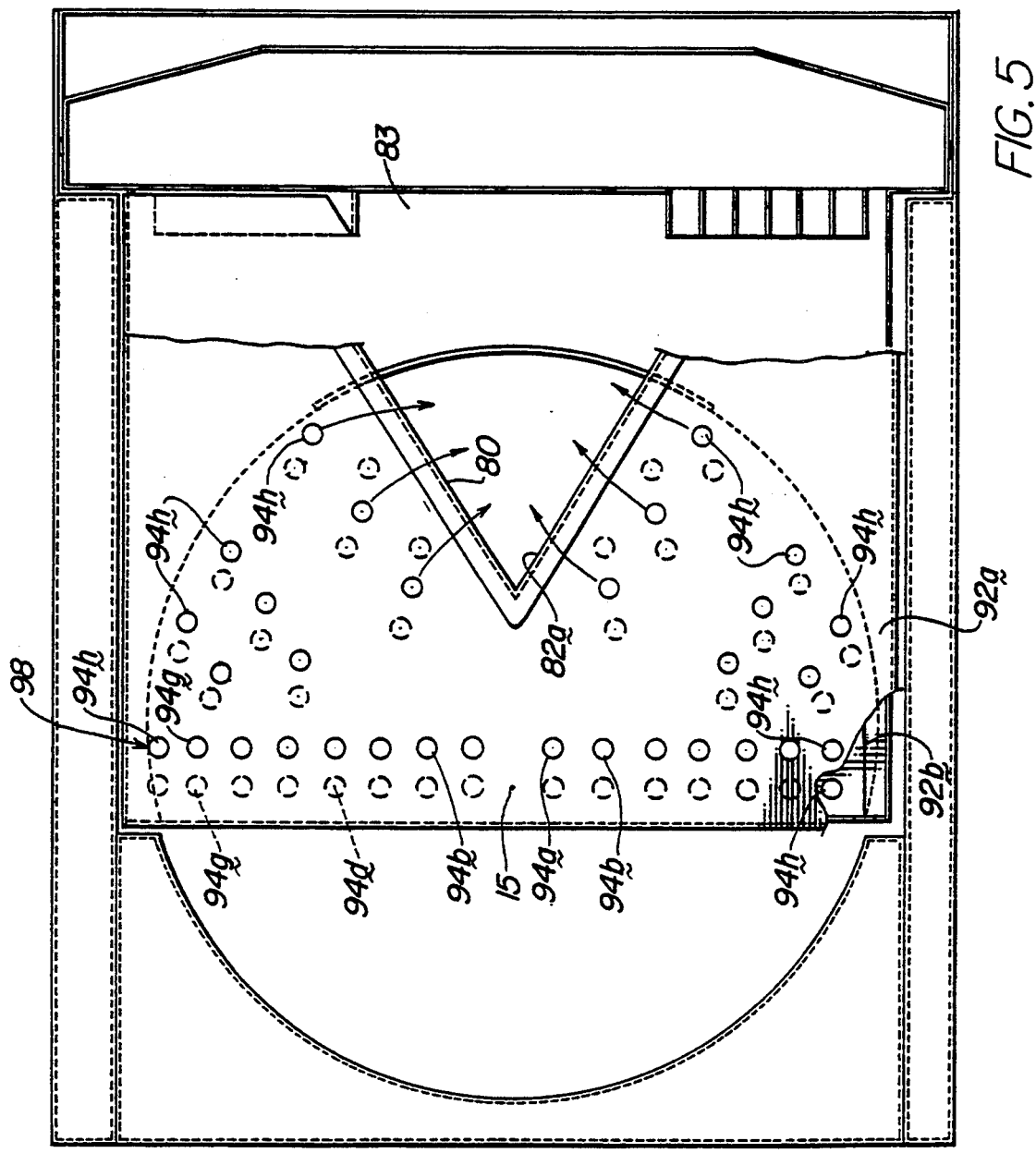
FIG. 5 is a cross-sectional view taken substantially along line 5—5 of FIG. 4.

As diagrammatically illustrated in FIG. 5 of the drawing, orifices 94 formed in the upper jet plate 92a preferably are not vertically spaced directly above orifices 94 formed in the lower jet plate 92b. The offsetting of orifices 94 in the upper plate relative to the orifices 94 in the lower plate results in improved penetration of air streams through a bed of particulate material.

Tubes (not shown) may be arranged to form multiple rows of streams of air forming a first and second array of openings through which the rapidly moving air is delivered. If it is deemed expedient to do so, a single slot inclined at an angle "A" relative to a vertical plane for forming a substantially continuous air stream which extends across the diameter of turntable 16 may be used to apply an air stream which is divided to retain temperature controlled air in the oven.

However, the orifice through which air is delivered for forming the air streams preferably has a uniform minimum dimension. As the width of a slot through which air is delivered increases the distance the air stream can be projected decreases rapidly.

If slots are to be used for forming air streams, a plurality of generally radially extending slots are formed in the jet plate with several short radially extending slots being formed adjacent the outer periphery of the turntable so that the combined area of the air streams impinging upon an area moving under the air streams is uniform radially over the surface of the food product. The sum of the areas of the slots should be arranged to approximate the sum of the areas illustrated in FIG. 6 of the drawing in the embodiment in which circular orifices were formed in perforated plates 92a and 92b.

SECOND EMBODIMENT

A second embodiment of the invention is illustrated in FIGS. 9–17 of the drawing.

The operation and function of the second embodiment of the heating apparatus is similar to that of the first embodiment hereinbefore described. However, as best illustrated in FIG. 10 of the drawing, an axial flow fan is employed and air returns adjacent sides 22' and 24' of the oven 20'.

The door 35' and turntable 16' are similar to the structure and their functions are substantially the same as that disclosed in Bingham U.S. Pat. No. 4,924,763, the disclosure of which is incorporated herein by reference in its entirety for all purposes.

Figure 15:
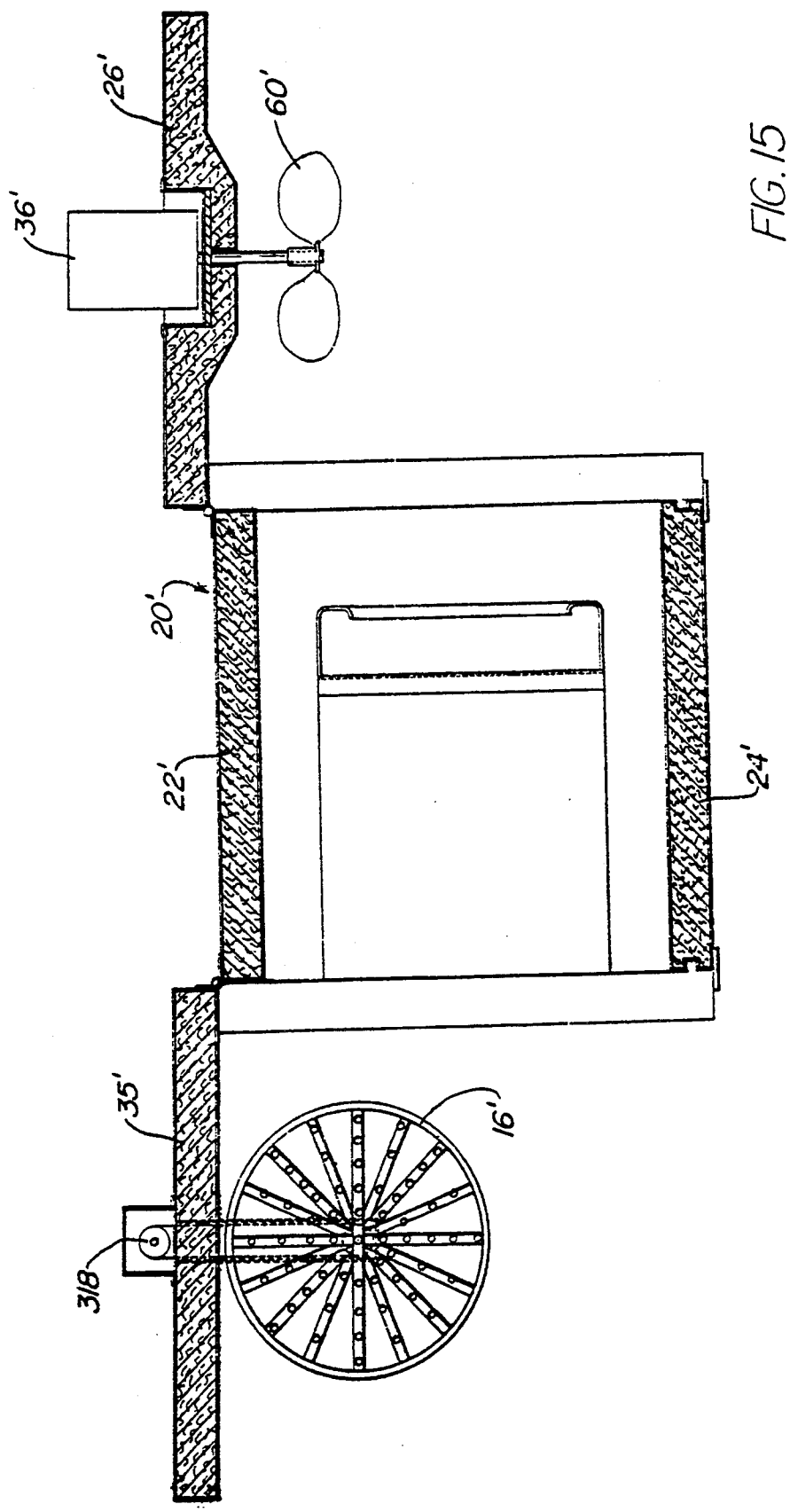
FIG. 15 is a cross-sectional view similar to FIG. 10, front and rear access doors being illustrated in an open position.

In the embodiment of the invention illustrated in FIGS. 10 and 15 of the drawing, the back wall 26' is hingedly secured to side wall 22'. As illustrated in FIGS. 10 and 15 of the drawing, door 35' and back wall 26' are hingedly secured to side wall 22' to facilitate cleaning and maintenance of the oven.

In the embodiment of the invention illustrated in FIG. 10 of the drawing, door 35' is hingedly connected to side wall 22' of the cabinet 20'. The turntable 16' is supported by a cantilever support member 310 and a motor 318 is mounted on the door 35'. Motor 318 has a drive shaft 318a having a sprocket 320 mounted thereon. A sprocket 322 is mounted on a shaft extending downwardly from turntable 16'. A chain 325 extends around sprocket 320 and sprocket 322 for drivingly connecting motor 318 to turntable 16'.

As best illustrated in FIG. 15 of the drawing, turntable 16' is moved out of cabinet 20' when door 35' is opened and is returned to the interior of the cabinet when door 35' is closed.

As illustrated in FIGS. 10 and 15 of the drawing, the axial flow fan 60' is driven by a motor 36' having a drive shaft extending through an opening in rear wall 26' which is hingedly connected to side wall 22'. When rear wall 26' is moved from the position illustrated in FIG. 10 of the drawing to the position illustrated in FIG. 15 of the drawing the axial flow fan 60' moves out of the cabinet 20' to facilitate cleaning the interior of the cabinet.

From the foregoing it should be readily apparent that other and further embodiments of the invention may be devised without departing from the basic concept thereof. For example, perforated plates 92a and 92b may be replaced with elongated tubes 192 for forming air streams as hereinbefore described. Slots or other air dispensing openings may be formed in plate 92 if it is deemed expedient to do so. Further, the spaced air dispensing ducts 90a and 90b may be replaced with a plate 92 inclined at an angle relative to a horizontal plane such that all of the air streams of the first and second array of streams are inclined at an angle "A" relative to a vertical plane such that streams of the first and second arrays of streams are substantially parallel.

Referring to Pages 5 and 6 of the drawing, it will be noted that the upper jet forming apparatus includes a plate 292 having air passages 294 formed therein. As diagrammatically illustrated in FIG. 17 of the drawing, the air passages are arranged to inscribe a series of concentric rings "A"–"O". Concentric rings in FIG. 17 of the drawing are designated by the letters A–O and air passages in each ring are designated by the letter designating the ring numeral reference unique to each passage in that ring. For example, passages $B_1$ and $B_2$. For example, passages $B_1$ and $B_2$ are located in ring B, while passages $C_1$, $C_2$ and $C_3$ are located in ring designated by the letter C. In the illustrated embodiment the innermost ring A is provided with one air passage while the second ring B is provided with two air passages and the fourth ring designated by the letter E is provided with four air passages. In the illustrated embodiment each air passage is approximately 7/16 of one inch in diameter and the center of each ring is spaced from the center of the adjacent ring a distance of one-half inch.

Figure 16:
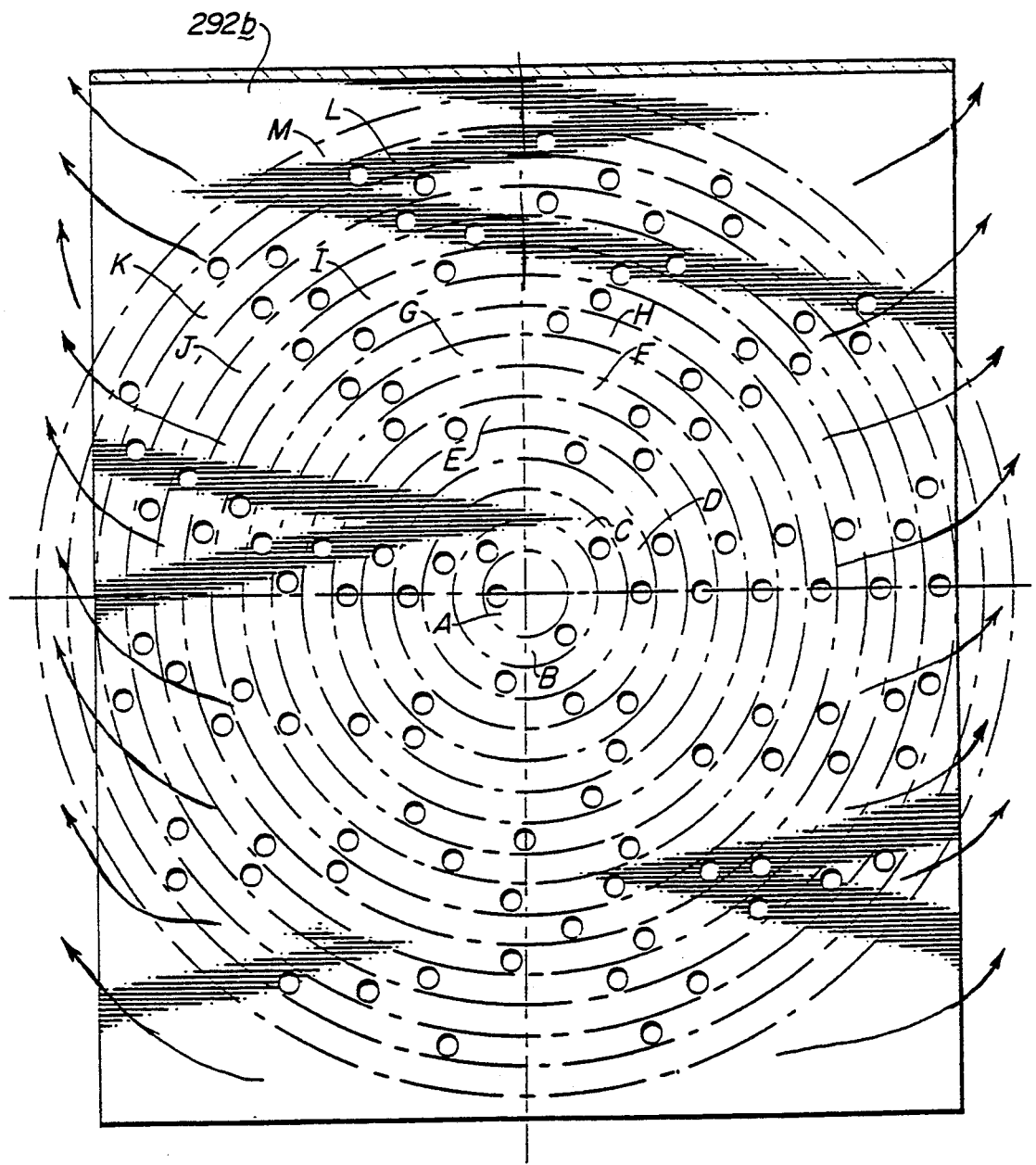
FIG. 16 is a cross-sectional view taken along line 16—16 of FIG. 14 illustrating an array of orifices distributed in a generally circular pattern arranged to permit return of spent air along sides of a baking zone.
Figure 17:
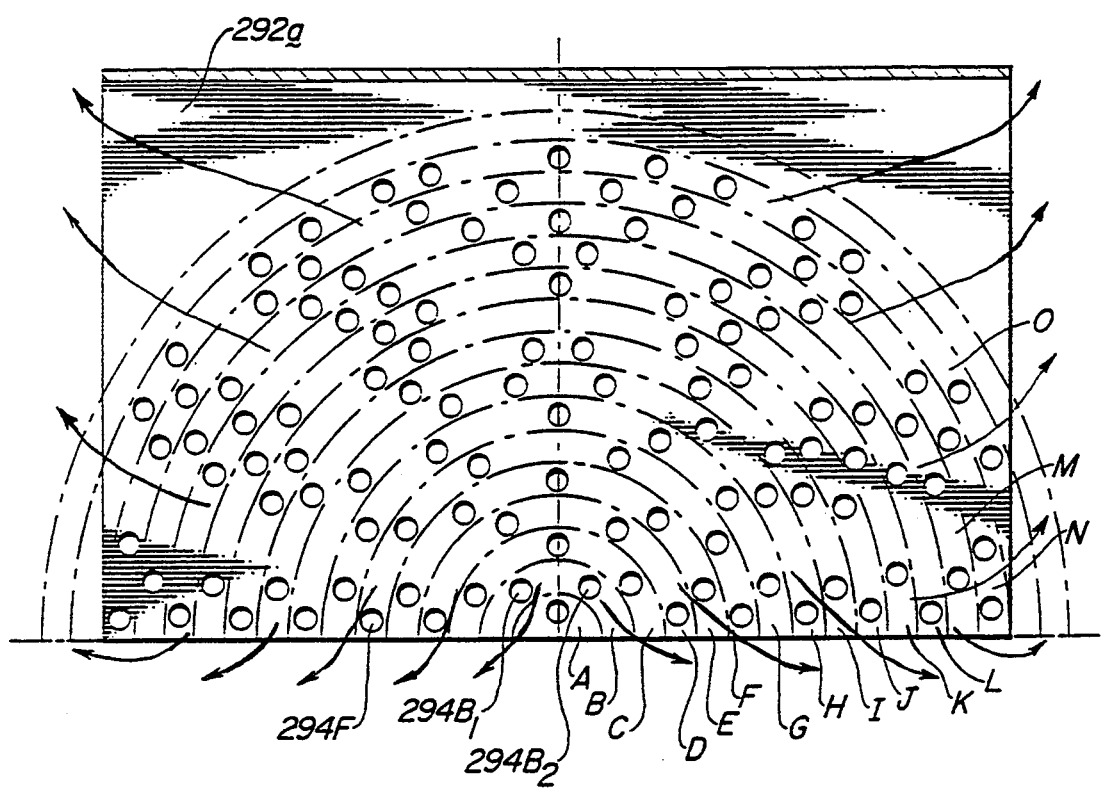
FIG. 17 is a view similar to FIG. 16, the array of orifices being laid out in a substantially semi-circular pattern permitting air flow laterally along sides of a baking zone.
Figure 18:
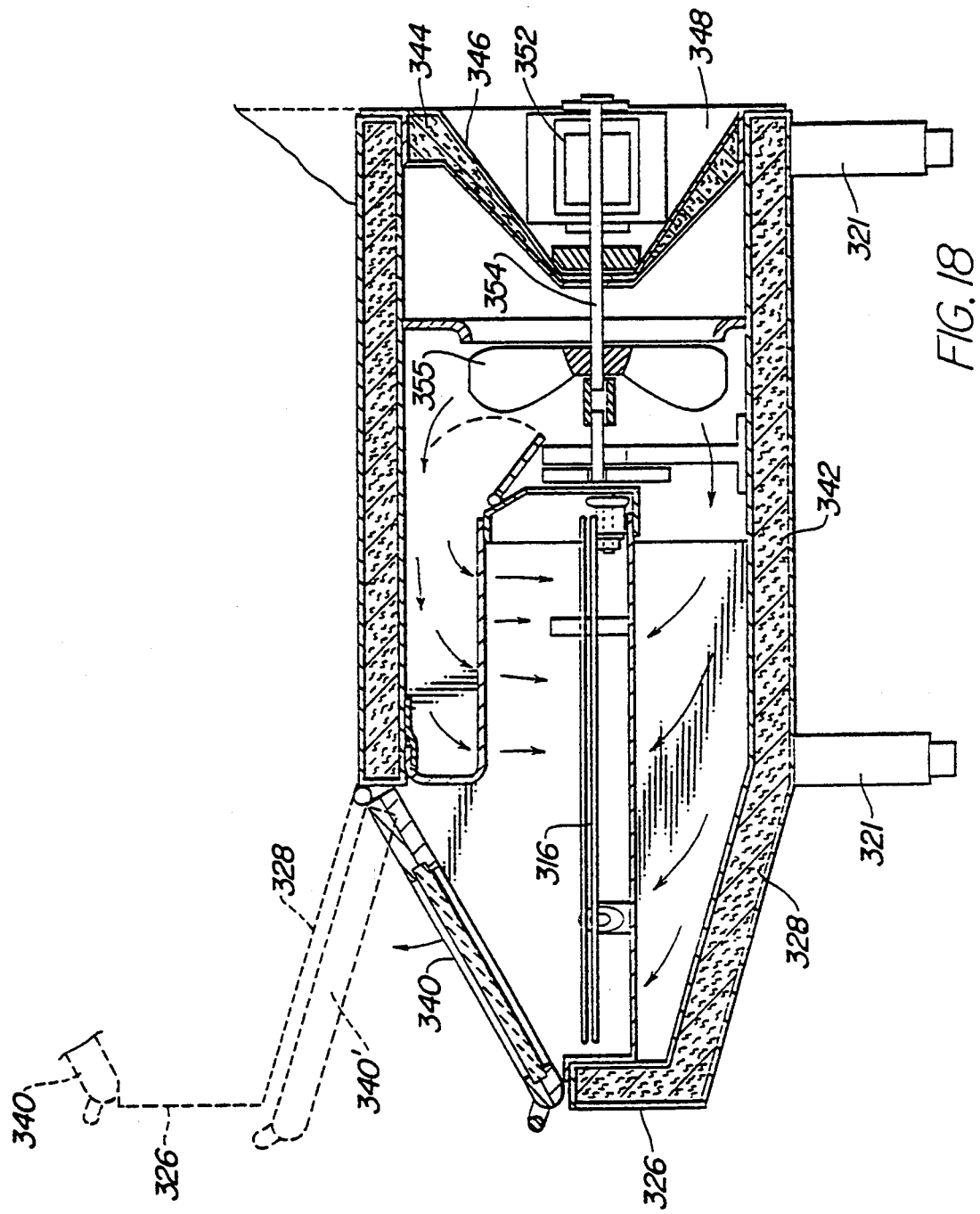
FIG. 18 is a cross-sectional view similar to FIG. 14 of a third embodiment.

Referring to FIG. 16 of the drawing, the rings of lower plate 292b are similarly designated A–O, with the innermost ring being designated A and the outermost ring being designated O.

The use of a turntable 16 with the "pie-shaped" air escape paths, and orifice designs permits very intensive air-to-solid heating or cooling.

Air jets impinging on a product reduce the boundary layer affect and enhance air-to-solid heat transfer. When these jets are applied to irregularly shaped objects the jets must project to be effective over a highly variable distance from the orifice. Preferably, this distance is 2 to 5 times the minimum orifice diameter. The "spent air" must have escape paths which provide minimum interference with the integrity of the projected air jet to avoid diffusion.

The "spent air" escape path must not apply detrimental back pressure to reduce flow of the air jets.

These factors affect the performance of impingement heat transfer devices, particularly in the arrangement or location of orifices and in limiting the orifice openings and air volume which can be applied to the target product area.

The air-to-solid heat transfer is enhanced by increasing the pressure differential across the orifices, usually by more air supply pressure. However, the heat transfer rate changes only in proportion to the ⅝ power of the velocity of the impinging air, i.e.:

$$h = 0.311 \left[ \frac{Vo(\text{ft/min})}{Z(\text{inches})} \right]^{0.625}$$

Both the mechanical effects on thin or small particle products and the requirement of more than proportional increase in velocity to achieve increase in heat transfer rate limit practical means to accomplish high air-to-solid heat transfer.

The most favorable means to increase air-to-solid heat transfer rate is by applying more air jets but the concentration of air jets is limited.

The ratio "R" is the orifice or air origin area divided by the total effective product area (plain flat surface) times 100. The effective product area includes space between fingers, slots, tubes or other air delivery means.

When surface effects are critical the time between applications of intensive heat is very critical so this becomes an important part of the system.

| Representative ratios "R" are: | |
|---|---|
| Jet impingement type conveyorized pizza ovens (FS-2, etc.) | 4 to 5 |
| Commercial bakery ovens (CB-14) | 4 to 5 |
| Meat browning ovens (CUS-11) | 8 to 11 |

Since the center area of a circle is small relative to the area near the circumference and since the spent air from the center has a continually expanding escape path as it moves from the center toward the circumference, very advantageous high ratios "R" applying high air delivery openings can be designed using circular turntable movement."

If the air is applied to a circular turntable by slots, the openings need to be much narrower near the center of the circle than near the circumference to apply as much air proportionately to the surface exposed to the air from the openings.

If round orifices are used to supply the air, openings near the center need to be small openings while those near the circumference need to be larger to supply proportionate heating.

However, narrow slots or smaller orifices near the center need to be closer to the product to give effective heat transfer rate, but larger openings near the circumference need to be farther away from the product to avoid "blocking air" flow. If the effective product distance from the air supply is optimally two to five times the minimum opening diameter, it is evident that the area near the center of the circle is less than one-fifth of the area of the equivalent sweep ring which is more than five times the average diameter of the center ring.

If the air supply plenum is spaced optimally for larger outer air supply openings then the smaller center openings will either be too far from the product or there will not be clearance to move products of variable heights. Thus, if the center small openings are properly distanced from the product, the outer larger openings are too close to the product or a conical applicator is needed.

To avoid the need to provide a conical, limited access, air source and to facilitate manufacture, air opening designs using openings of equal minimum width, round holes or slots and applying multiples of these similar openings, provide equivalent jet opening area to target area ratio in each ring of the turntable circle.

The arrangement of the opening within each concentric ring is, also, very important to prevent "washout" of spent air from the farthest openings sweeping under the air from openings in the return path. When the openings are positioned approximately in rows with continuous openings for return paths between the rows, less washout is encountered.

A further advantage of the rotating turntable is that the air supply openings do not necessarily need to be uniformly spaced so that they can be clustered or randomly placed within their respective ring.

The required ratio of area of escape path to air supply opening is, of course, dependent upon a variety of factors:

1. The velocity and integrity of the air stream is strongest near the opening and the streams have not spread as much so space between the jets is largest near the opening.

2. The escape path is larger if the product is spaced further away from the air supply opening.

3. The most vulnerable widest and slowest moving part of the air stream is at its farthest extension, i.R. at a low point when the stream is directed at an irregularly shaped target.

An example is a heating or cooling device with ½ inch diameter air openings spaced 3½ inches over a turntable surface and accommodation of variable height products from one to two and one-half inches high. Under these conditions and with moderately stable product, the average planer spent air escape area is preferably to equal at least four times the air supply area.

The volume of escaping spent air increases with velocity of air inlet, but the resistance to deflection or dilation also increases with higher air stream velocity.

The pie or wedge shaped segment of a round turntable may have twice as high air supply opening area as in linear, rectangular coordinate air application areas because the area from near the center of the turntable is much smaller than the vee shaped escape path as the air moves to the perimeter.

Part of the importance of higher Ratio "R" or opening to planer product ratio is that surface effects such as crisping, browning, searing or shell freezing of moist food products (U.S. Pat. No. 3,884,213 method) are modified by the energy dissipation of evaporation of the water migrating to the surface, latent heat and product conductivity.

The faster the heat transfer to the surface, the better and faster certain surface effects can be accomplished. Often very rapid surface heating can reduce undesirable heating of the interior of the product so that better processing and energy savings result.

Important and unique methods and devices in this disclosure include:

Use of a turntable in a cavity with recirculating air to repeatedly expose products to streams of controlled temperature air to accomplish either heating or cooling of the products.

A device applying jets of air to impinge upon circular areas or rings of product in which the jets are placed at irregular intervals around the circular rings to allow spent air escape paths between successive partial radial rows of jets to reduce washing out, i.e. deflecting, the jets in path of the returning air toward the blower. The air streams are preferably caused to impinge upon the irregular surfaces of moist food products to accomplish crisping, browning, searing or shell cooling or freezing. The circular air supply openings 94 applying air jet impingement to products on a rotating turntable exceed 5 or 6 percent of the planer area of the product and the area of the air supply openings exceeds 10 percent of the planar area of the product.

In the embodiment of FIGS. 9–17, the rotating turntable repeatedly exposes product P to air streams from openings located so that minimum washout from recycling spent air is encountered when the air return is around the periphery of the turntable.

Referring to FIG. 19 of the drawing, the numeral 320 generally designates a cabinet for an axial flow air impingement heat transfer apparatus. Cabinet 320 comprises spaced sidewalls 322 and 324, a generally vertically extending front wall 326 and backwall 44 extending transversely between the side walls. A downwardly inclined front wall panel 328 is secured to a lower edge of front wall 326 and a generally upwardly inclined front wall panel 330 is secured to the upper edge of front wall 326. A top wall 332 and a bottom wall 342 extend between sidewalls 322 and 324 and are connected to upwardly and downwardly inclined front wall panels 328 and 330. The rear wall 344 extends between sidewalls 322 and 324 and between top wall 332 and bottom wall 342 to form an enclosed cooking cavity 350.

The upwardly inclined front wall panel 330 has an opening formed therein closed by a door 334 pivotally secured by a piano hinge 336 adjacent an upward edge thereof to the upwardly inclined front wall panel 330. A glass panel 340 in front loading door 334 provides for visual inspection of the contents of cavity 350.

Cabinet walls 322–344 are preferably formed of spaced sheets of stainless steel sheet material having insulation disposed therebetween to prevent thermal conduction of heat therethrough. Front loading door 334 is provided with suitable gaskets (not shown) which sealingly engage against edges of the opening formed in upwardly inclined front wall panel 330.

Rear wall 344 is provided with a deflected portion 346 forming a generally conical shaped recess in which a motor 352 is mounted. The motor 352 has a drive shaft 354 extending through the back wall 344 of cabinet 320 and is drivingly secured to a blower fan blade 355.

The configuration of the cabinet 320 permits a plurality of ovens to be stacked one on top of the other while providing access to the interior of each of the ovens upon movement of the door from the full outline position to the dashed outline position.

It should be appreciated that other and further embodiments of the invention may be devised without departing from the basic concept thereof.

It is claimed:

1. Impingement heat transfer apparatus comprising: a cabinet having an interior chamber; a turntable in said chamber, said turntable rotating about an axis; air circulating apparatus having an intake opening and a delivery opening communicating with said chamber; an air dispenser for receiving air from said delivery opening and for directing spaced streams of air toward said turntable; air return means for delivering air to said intake opening, said air return means having an opening bounded by converging edges intersecting at an apex to form a generally V-shaped opening positioned to draw air between said spaced streams, said apex of said opening being positioned adjacent said axis said turntable rotates about such that the width of said V-shaped opening is wider adjacent the outer periphery of said turntable than the width of said V-shaped opening adjacent said apex.

2. Impingement heat transfer apparatus according to claim 1, said air dispenser having multiple concentric arrays of passages extending about said axis, the number of passages in each said array of passages being selected to control the volume of air delivered through passages of each array of passages.

* * * * *